(12) United States Patent
Tokumoto

(10) Patent No.: US 6,988,421 B2
(45) Date of Patent: Jan. 24, 2006

(54) ROTATION ANGLE DETECTING DEVICE AND TORQUE DETECTING DEVICE

(75) Inventor: Yoshitomo Tokumoto, Mie (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/693,489

(22) Filed: Oct. 27, 2003

(65) Prior Publication Data

US 2004/0083823 A1 May 6, 2004

(30) Foreign Application Priority Data

Oct. 28, 2002 (JP) ................................. P.2002-312759

(51) Int. Cl.
*G01L 3/02* (2006.01)

(52) U.S. Cl. ................................. 73/862.333
(58) Field of Classification Search ............ 73/862.328,
73/862.326, 862.325, 862.333, 862.334,
73/862.335, 862.08; 324/208, 207.12, 207.21;
318/432, 488.2
See application file for complete search history.

(56) References Cited

U.S. PATENT DOCUMENTS

| | | |
|---|---|---|
| 5,260,653 A | 11/1993 | Smith et al. |
| 5,561,368 A | 10/1996 | Dovek et al. |
| 6,031,372 A | 2/2000 | Van Den Berg |
| 2002/0020229 A1 * | 2/2002 | Nakamura et al. ..... 73/862.333 |

FOREIGN PATENT DOCUMENTS

| | | |
|---|---|---|
| DE | 195 36 433 A1 | 10/1997 |
| DE | 199 33 243 A1 | 2/2000 |
| JP | 61-223525 | 10/1986 |
| JP | 2002-82002 | 3/2002 |
| JP | 2002 082002 | 3/2002 |

OTHER PUBLICATIONS

Search Report dated Apr. 14, 2005.

* cited by examiner

Primary Examiner—Max Noori
Assistant Examiner—Takisha Miller
(74) Attorney, Agent, or Firm—McGinn & Gibb, PLLC

(57) ABSTRACT

A rotation angle detecting device and a torque detecting device, which can prevent waveforms to be outputted from a plurality of semiconductor MR elements, from dispersing due to the material difference of a semiconductor wafer. A plurality of semiconductor MR elements are formed over a common cell of a semiconductor wafer and are arranged to confront at such positions different from each other in a target circumferential direction with respect to corresponding input and output shafts that signals to be outputted according to the rotations of the input and output shafts to be detected may establish a predetermined phase difference in an electrical angle.

18 Claims, 3 Drawing Sheets

ROTATION ANGLE DETECTING DEVICE AND TORQUE DETECTING DEVICE

BACKGROUND OF THE INVENTION

The present invention relates to a rotation angle detecting device for detecting the angle of rotation of a rotary member such as a vehicular steering shaft, and to a torque detecting device for detecting a torque to be applied to the rotary member, and a method of manufacturing the rotation angle detecting device.

As an auxiliary steering device mounted on a vehicle such as an automobile for assisting the steering operation of a driver, there is an electric power steering device for applying the turning force of an electric motor, for example, as steering assisting force. This electric power steering device is provided with an input shaft and an output shaft, which are so connected to a steering member and steering wheels side, respectively, as to rotate according to the steering operation of the driver. Into this steering device, moreover, there are incorporated a rotation angle detecting device including sensor units for detecting the respective rotation angles of the input and output shafts, and a torque detecting device for detecting the steering torque to be applied to the steering member by using the detection results of the detecting device. The steering device assists the steering operation by deciding an instruction value to the electric motor on the basis of the detected steering torque and by transmitting the motor turning force to a steering system through a reduction mechanism thereby apply the steering assisting force to the steering system.

Moreover, the sensor unit of the rotation angle detecting device is provided with targets made of magnetic members and mounted integrally rotatably on the respective input and output shafts, and magnetic sensors including magnetoresistive effect (MR) elements arranged to confront at a predetermined gap on the outer circumferences of the targets, for outputting output signals varying periodically according to the rotations of the corresponding input and output shafts. In this sensor unit, two regions of a linear region in which the outputs of the sensors linearly change and a nonlinear region in which the outputs nonlinearly change appear according to the circumferential shape of the targets. Therefore, the sensor unit is constructed to obtain a common output waveform for two channels different each other only in phase by providing two magnetic sensors for both the input and output shafts and by arranging those sensors with a shift in the circumferential direction of the corresponding target. In this detecting device of the related art, the detecting precisions of the respective rotation angles of the input/output shafts are prevented from degrading (as referred to Patent Publication 1, for example) by using the respective outputs of the two channels so that the outputs are supplemented each other so as to detect the rotation angle at all times by using the sensor outputs in the linear regions (See, for example, JP-A-2002-82002).

However, in case the rotation angle detecting device of the related art uses the semiconductor MR elements as the aforementioned MR elements, the outputs of two channels of the two semiconductor MR elements may fail to have the aforementioned identical waveforms different each other only in phase due to the material difference of the semiconductor MR elements. More specifically, in this detecting device of the related art, a one-chip sensor having the MR elements formed in one cell of the semiconductor wafer is used as the MR element for each channel, and either two sensor chips of different rod numbers of the semiconductor wafer or two sensor chips formed in cells at mutually spaced positions over a common wafer may be combined and used as the MR element of two channels. Therefore, these MR elements of two channels may not have identical electric characteristics such as temperature characteristics due to the material difference of the MR elements. In case the MR elements are arranged at positions shifted in the circumferential direction of the targets, therefore, the waveforms of the outputs of the two channels may be different not only in the phase but also in the amplitude or the like.

SUMMARY OF THE INVENTION

In view of the aforementioned problems of the related art, the present invention has an object to provide a rotation angle detecting device and a torque detecting device, which can prevent waveforms to be outputted from a plurality of semiconductor MR elements, from dispersing due to the material difference of a semiconductor wafer.

In order to solve the aforesaid object, the invention is characterized by having the following arrangement.

(1) A rotation angle detecting device comprising:
a target including a magnetic member connected integrally rotatably with a rotary member; and
a plurality of magnetic sensors arranged to confront the magnetic member for outputting signals according to a rotation of the rotary member,
wherein the magnetic sensors respectively include semiconductor MR elements, and the semiconductor MR elements are formed over and integrally with a common cell of a semiconductor wafer.

(2) The rotation angle detecting device according to (1), wherein the semiconductor MR elements are arranged over the common cell and at circumferential positions different from each other with respect to the rotary member.

(3) The rotation angle detecting device according to (1), wherein the semiconductor MR elements are fixed integrally to a substrate through an adhesive layer.

(4) A torque detecting device comprising:
a rotation member including a first rotary shaft and a second rotary shaft connected coaxially to the first rotary shaft;
rotation angle detecting devices provided to the first and second rotary shafts, respectively, each of the rotation angle detecting devices including,
  a target including a magnetic member connected integrally rotatably with the corresponding first or second rotary shaft, and
  a plurality of magnetic sensors arranged to confront the magnetic member for outputting signals according to a rotation of the corresponding first or second rotation shaft,
  wherein the magnetic sensors respectively include semiconductor MR elements, and the semiconductor MR elements are formed over and integrally with a common cell of a semiconductor wafer; and
a torque detecting unit for detecting a torque to be applied to the rotary member based on signals outputted from the corresponding rotation angle detecting devices.

(5) The torque detecting device according to (4), wherein all the magnetic sensors contained in the rotation angle detecting devices are constituted by using semiconductor MR elements formed integrally over a common cell of a semiconductor wafer.

(6) A method of manufacturing a rotation angle detecting device comprising the steps of:
  integrally forming a plurality of semiconductor MR elements on a cell of a semiconductor wafer;
  fixing the cell to a substrate; and
  arranging the substrate with the cell so that the plurality of semiconductor MR elements confront a target including a magnetic member connected integrally rotatably with a rotary member.

BRIEF DESCRIPTION OF THE DRAWINGS

FIG. 4C is a diagram showing a plurality of semiconductor MR elements, as contained in the sensor unit, to be formed in a common cell of a semiconductor wafer.

DESCRIPTION OF THE PREFERRED EMBODIMENTS

Preferred embodiments of the invention of a rotation angle detecting device and a torque detecting device will be described with reference to the accompanying drawings. Here will be described the case, in which the invention is applied to an electric power steering device as an electric type auxiliary steering device.

Figure 1:
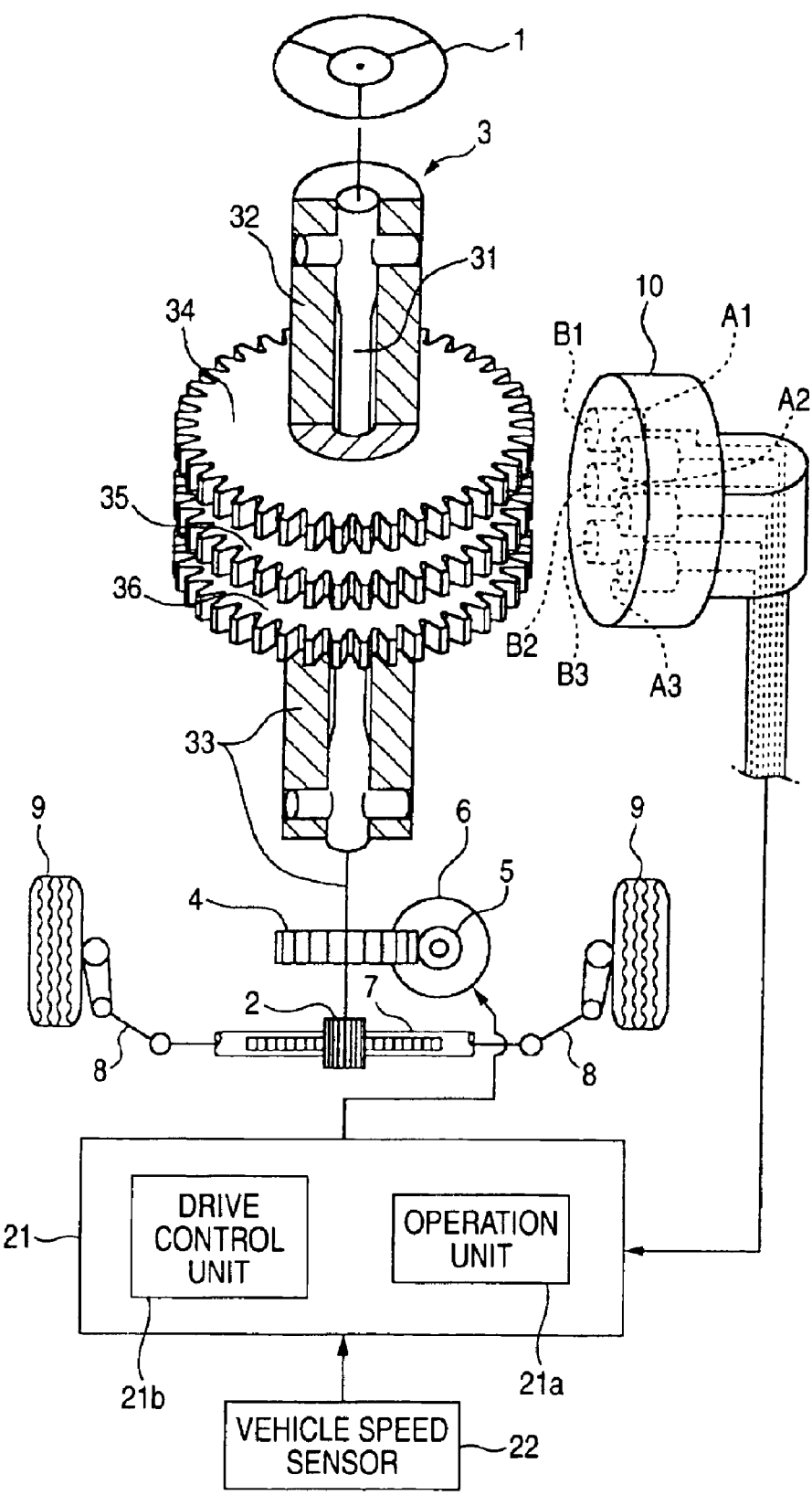
FIG. 1 is a diagram schematically showing a structure of an electric power steering device according to one embodiment of the invention.

FIG. 1 is a diagram schematically showing a construction of the electric power steering device according to one embodiment of the invention. In FIG. 1, this device is so mounted on an automobile, for example, that a steering shaft 3 is interposed between a steering member (or steering wheel) 1 and a pinion 2. The steering shaft 3 is provided with: a torsion bar 31 disposed at the center of the steering shaft 3; an input shaft 32 acting as a first rotary shaft and fixed on the input (upper) side of the torsion bar 31; and an output shaft 33 acting as a second rotary shaft and fixed on the output (lower) side of the torsion bar 31. The input shaft 32 and the output shaft 33 are arranged coaxially with each other and is connected to each other not directly but through the torsion bar 31.

The steering member 1 is connected to the input shaft 32 so that the rotation of the steering member 1 by the steering operation of a driver is transmitted directly to the input shaft 32.

To the output shaft 33, there are connected: a reduction mechanism having a worm 5 and a worm wheel 4 meshing with the worm 5; and a steering assisting electric motor 6 having an output shaft, on which the worm 5 is mounted integrally rotatably therewith, and controlled by a control unit 21. The rotation of the electric motor 6 is reduced and transmitted as a steering assisting force to the pinion 2. This rotation of the pinion is converted into linear motions of a rack 7 thereby to steer steering wheels 9 through left and right tie rods 8. The reduction mechanism and the electric motor 6 construct an auxiliary steering unit for applying the steering assisting force to a steering system leading from the steering member 1 to the steering wheels 9.

Figure 2:
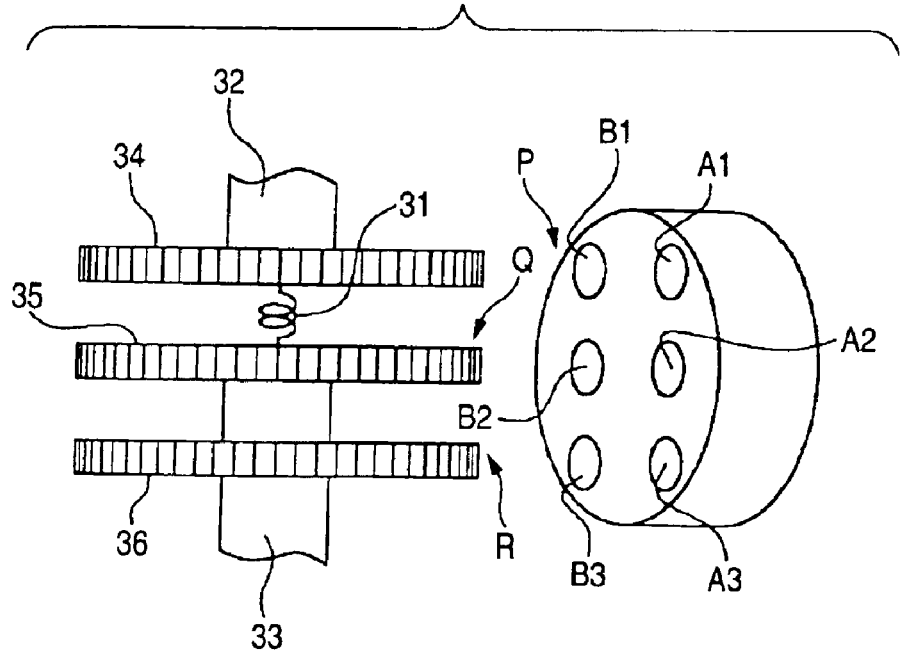
FIG. 2 is a diagram schematically showing a torsion bar, an input shaft, an output shaft, respective target gears and magnetic sensors in the electric power steering device.

The input shaft 32 and the output shaft 33 are respectively provided with sensor units, which are included in the rotation angle detecting device of the invention; for detecting the respective angles of rotation of the input and output shafts 32 and 33, which rotate according to the steering operation on the steering member 1. With additional reference to FIG. 2, more specifically, a first target gear 34 is so mounted on the input shaft 32 as to rotate together. First magnetic sensors A1 and B1 are arranged outside of the outer circumference of that target gear 34. Likewise, second and third target gears 35 and 36 are so mounted on the output shaft 33 as to rotate together. Second and third magnetic sensors A2 and B2, and A3 and B3 are respectively arranged outside of the outer circumferences of those target gears 35 and 36.

The first target gear 34 and the first magnetic sensors A1 and B1 construct a first sensor unit P for outputting a signal according to the rotation angle of the input shaft 32, to the control unit 21. The second target gear 35 and the second magnetic sensors A2 and B2 construct a second sensor unit Q for outputting a signal according to the rotation angle of the output shaft 33, to the control unit 21. The third target gear 36 and the third magnetic sensors A3 and B3 construct a third sensor unit R for outputting a signal according to the rotation angle of the output shaft 33, to the control unit 21. This control unit 21 detects the absolute rotational position of the output shaft 33 with the outputs of the second and third sensor units Q and R.

The respective target gears 34 to 36 are formed into the shape of a spur gear, of which outer circumference teeth of a magnetic material form targets having equally spaced corrugations. The tooth numbers of the first target gear 34 and the second target gear 35 are equal at N (e.g., 36), and the tooth number of the third target gear 36 is a prime (e.g., 35) (having no common divisor other than 1) to N.

On the other hand, the first to third magnetic sensors A1 and B1, A2 and B2, and A3 and B3 are arranged in such three steps and two rows as to confront the teeth of the outer circumferences of the corresponding target gears 34 to 36, and are housed in a sensor box 10. This sensor box 10 is fixed at a predetermined position of a vehicle body, and retains and keeps such a gap at a predetermined distance as is located between the respective magnetic sensors A1 and B1, A2 and B2, and A3 and B3 and the corresponding outer circumference teeth. The first magnetic sensors A1 and B1 are arranged to confront the different circumference positions of the first target gear 34. Likewise, the second magnetic sensors A2 and B2 are arranged to confront the different circumference positions of the second target gear 35, and the third magnetic sensors A3 and B3 are arranged to confront the different circumference positions of the third target gear 36.

Figure 4A:
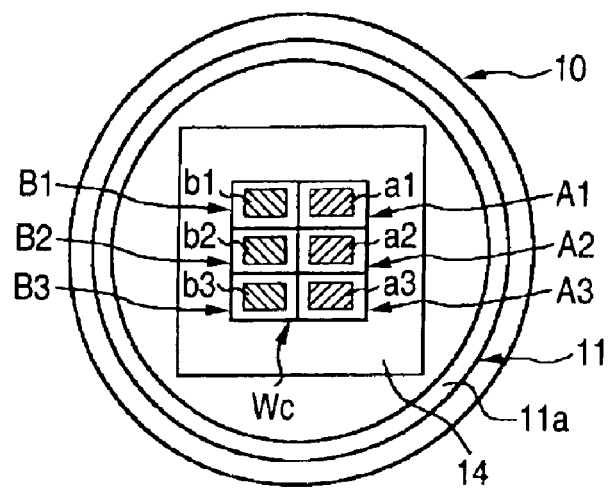
FIGS. 4A, 4B and 4C are structural diagrams showing a specific construction example of a sensor unit shown in FIG. 1, FIGS. 4A and 4B are a top plan view and a side elevation of the sensor unit, respectively.
Figure 4B:
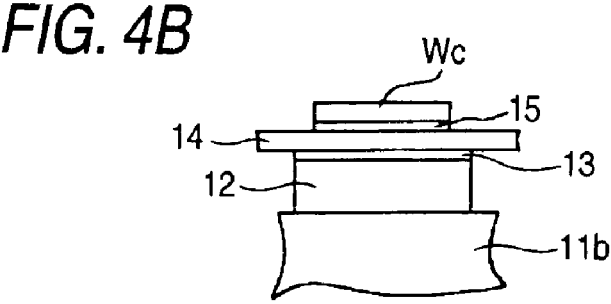

With reference to FIG. 4, the respective magnetic sensors A1 to A3 and B1 to B3 are constructed to include elements such as magnetoresistive effects (MR) elements a1 to a3 and b1 to b3, respectively, which are characterized to have resistances varied by the action of the magnetic field. More specifically, these magnetic sensors A1 to A3 and B1 to B3 are arranged in a cylinder portion 11a formed on a bottom plate 11 of the sensor box 10, and are fixed (as referred to FIG. 4A) on a support bed 11b (FIG. 4B) formed at the cylindrical portion 11a. Here, the sensor box 10 is sealed by attaching a cover portion (although not shown) for covering the front face sides of the magnetic sensors A1 to A3 and B1 to B3 to the cylinder portion 11a, so that the magnetic sensors A1 to A3 and B1 to 33 are protected by the sensor box 10.

On the other hand, the MR elements a1 to a3 and b1 to b3 are the semiconductor MR elements, in which detecting circuits for detecting the change in the intensity of the magnetic field are formed by diffusing Indium (In) and Antimony (Sb), for example, into a silicon wafer and by patterning the wafer to give a predetermined pattern by a masking method. All the elements a1 to a3 and b1 to b3 are integrally formed (as referred to FIG. 4C) over one cell Wc formed in a semiconductor wafer W.

Figure 4C:
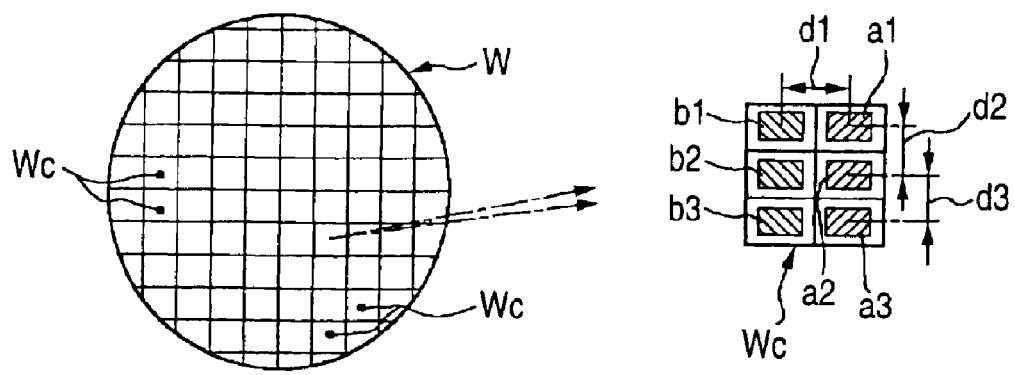

More specifically, in the cell Wc, the pair of adjacent MR elements a1 to a3 and b1 to b3 in the traverse direction of FIG. 4C for each of the targets 34 to 36 have a predetermined size d1 in the circumferential direction of the steering shaft 3. Therefore any discrepancy is prevented in the parallelism and the azimuth angle between the MR elements a1 to a3 and b1 to b3 of respective pairs, and the signal outputted from the MR elements a1 to a3 and b1 to b3 of respective pairs cause a predetermined phase difference in an electrical angle. On the other hand, the axial sizes indicated by d2 and d3 in FIG. 4C are set, respectively, on the basis of the axial size between the targets 34 and 35 and the axial size between the targets 35 and 36. When the sensor units P, Q and R are assembled such that the magnetic sensors A1 to A3 and B1 to B3 are arranged to confront their corresponding targets 34 to 36, the respective MR elements a1 to a3 and b1 to b3 confront the teeth of the targets 34 to 36 within a predetermined allowable error range.

The cell Wc is adhered through an adhesive layer 15 to a supporting substrate 14 such as a glass substrate or a PCB (polychlorinated biphenyl) substrate so that all the elements a1 to a3 and b1 to b3 are integrally fixed on the substrate 14 through the adhesive layer 15. A magnetic field generating magnet (permanent magnet) 12 made of a neodymium magnet, for example, on which the substrate 14 is fixed through an adhesive layer 13 (as referred to FIG. 4B) is mounted on the support bed 11b.

Other than the construction thus far made, each MR element may be provided with the substrate and the magnet. However, the aforementioned construction, in which one substrate 14 and one magnet 12 are shared among the six MR elements a1 to a3 and b1 to b3 and in which the adhesive layers 15 and 13 are disposed below the cell Wc, is preferred to the construction, in which the substrates and the magnets are separately provided, because it can arrange the MR elements a1 to a3 and b1 to b3 at the predetermined distance to the targets 34 to 36 while preventing the mounting heights of the substrates and the magnets from the support bed 11b reliably from becoming different and while preventing the relative distances between the respective MR elements a1 to a3 and b1 to b3 and the targets 34 to 36 from becoming different.

Moreover, the not-shown DC source is connected with the respective MR elements a1 to a3 and b1 to b3. The changes in the intensities of the magnetic fields, as accompanying the changes in the distances from the teeth of the corresponding targets 34 to 36, from the magnet 12 are detected by changing the resistances of the elements a1 to a3 and b1 to b3.

The respective magnetic sensors A1 to A3 and B1 to B3 output the changes in the intensities of the magnetic fields detected by the MR elements a1 to a3 and b1 to b3 included therein, as the voltage signals which change periodically according to the corrugations (or teeth) of the outer circumferences of the confronting respective target gears 34 to 36. Specifically, when the first target gear 34 rotates together with the input shaft 32 in accordance with the steering operation of the driver, the output signals of the first magnetic sensors A1 and B1 are made into the periodic signals varying periodically according to the change (or the angular displacement) in the rotation angle of the input shaft 32 and the target gear 34 due to the corrugations of the outer circumference. When the second target gear 35 rotates together with the output shaft 33, the output signals of the second magnetic sensors A2 and B2 are made into the periodic signals varying periodically according to the change in the rotation angle of the output shaft 33 and the target gear 35 due to the corrugations of the outer circumference. When the third target gear 36 rotates together with the output shaft 33, the output signals of the third magnetic sensors A3 and B3 are made into the periodic signals varying periodically according to the change in the rotation angle of the output shaft 33 and the target gear 36 due to the corrugations of the outer circumference.

Figure 3:
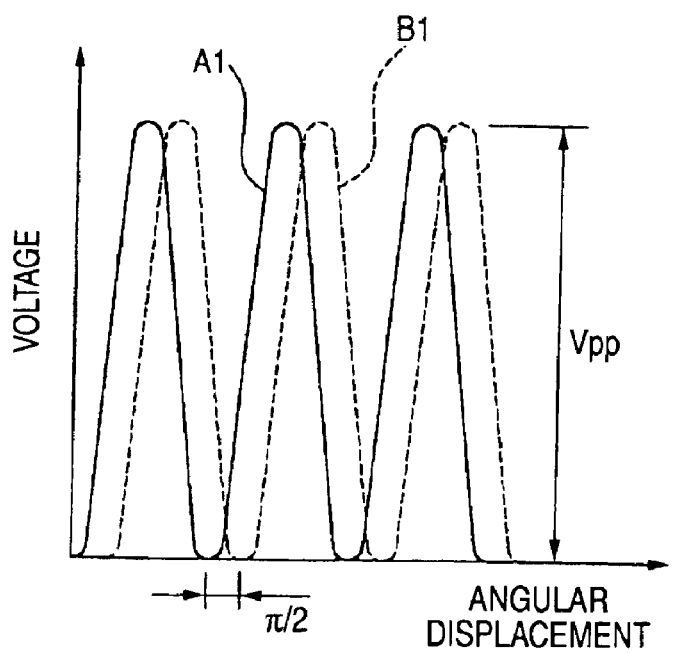
FIG. 3 is a graph illustrating an output signal (or voltage) from the magnetic sensors.

Moreover, the first magnetic sensors A1 and B1 are so arranged to confront the first target gear 34 that their output signals may establish a phase difference of $\pi/2$, for example, in the electrical angle, as shown in FIG. 3. Likewise, the second magnetic sensors A2 and B2 are so arranged to confront the second target gear 35 that their output signals may establish the phase difference of $\pi/2$, and the third magnetic sensors A3 and B3 are so arranged to confront the third target gear 36 that their output signals may establish the phase difference of $\pi/2$. By thus shifting the phases of the output signals from the two magnetic sensors A1 to A3 and B1 to B3 in the first to third sensor units P, Q and R, even if nonlinear changes appear near the maximal and minimal values of the output waveform, the control unit 21 can use, when the signal of one of the two magnetic sensors A1 to A3 and B1 to B3 is in the nonlinear region, the signal of the other in the linear region, thereby to prevent the respective rotation detecting precisions of the input and output shafts 32 and 33 from degrading.

Moreover, the tooth number (=35) of the third target gear 36 is less by 1 than the tooth number (=36) of the second target gear 35 so that the output of the third magnetic sensor A3 and B3 causes a phase shift of $((2\pi/36)-(2\pi/35))$ per rotation $(2\pi/36)$ of the output shaft 33 from the output of the second magnetic sensor A2 and B2 and returns for one rotation of the output shaft 33. By examining and tabulating the relation in advance between the absolute rotation position of the output shaft 33 and the aforementioned phase shift, therefore, the absolute rotation position of the output shaft 33 can be indexed from the phase shift. This table is stored in advance in the later-described data storage unit of the control unit 21.

The control unit 21 is provided with an operation unit 21a for performing a predetermined arithmetic operation with the outputs of the first to third sensor units P, Q and R, and a drive control unit 21b for controlling the drive of the electric motor 6 on the basis of the operation results of the operation unit 21a. The signal of a vehicle speed detected by a vehicle speed sensor 22 is inputted to this control unit 21, so that the control unit 21 decides the turning force to be generated by the electric motor 6, in view of the running speed of the automobile. Moreover, the control unit 21 is provided with a (not-shown) data storage unit constructed of a nonvolatile memory or the like, which is suitably stored in advance with not only a program or tabulated information necessary for the drive control of the electric motor 6 but also the operation results of the respective portions of the unit 21 and the information indicating the running state of the automobile from the vehicle speed sensor 22.

The operation unit 21a is constructed to have: the function of a rotation angle detecting unit for detecting the respective rotation angles of the corresponding input and output shafts 32 and 33 based on the output signals of the magnetic sensors A1 to A3 and B1 to B3; the function of a torque detecting unit for detecting the steering torque to be applied to the steering member 1 based on the respective rotation angles detected by the rotation angle detector; and the function to determine the steering torque and the steering angle to be applied to the steering member 1, by calculations with the detected respective rotation angles, thereby to decide the steering assisting force to be applied from the auxiliary steering unit, on the basis of the steering torque and steering angle determined. Specifically, the operation unit 21a acquires the outputs of the sensor units P and Q, for example, for a predetermined sampling period, and obtains the rotation angles of the corresponding input shaft 32 and output shaft 33, and then determines the absolute values of the relative rotation angle of the input and output shafts 32 and 33 thereby to calculate the steering torque and steering angle to be applied to the steering member 1. On the basis of the steering torque and steering angle calculated, the operation unit 21a decides a command value to the electric motor 6 and instructs the drive control unit 21b. Here, the operation unit 21a is capable of determining the absolute value of the absolute rotation angle of the output shaft 33 and of calculating the steering torque and the steering angle by using the output of the third sensor unit R.

On the basis of the command value instructed by the operation unit 21a, the drive control unit 21b feeds the electric motor 6 with an electric current and drives the electric motor 6. As a result, the electric power steering device according to the embodiment can detect the steering operation of the driver and can apply the steering assisting force according to the operation.

In the electric power steering device according to the embodiment, as has been described hereinbefore, all the MR elements a1 to a3 and b1 to b3 of the six channels contained in the sensor units P, Q and R are integrally formed over the common cell Wc of the wafer W. As a result, it is possible to make uniform the electric characteristics such as temperature characteristics in those MR elements a1 to a3 and b1 to b3, and to prevent the output waveforms of the magnetic sensors A1 to A3 and B1 to B3 from dispersing due to the material difference of the semiconductor wafer W. As a result, the output waveforms of the respective magnetic sensors A1 to A3 and B1 to B3 can be adjusted by the same method (or with the same adjusting value) so that the adjusting work of the sensor outputs can be easily done.

Moreover, this embodiment uses the MR elements a1 to a3 and b1 to b3 of six channels formed integrally over the common cell Wc so that the respective mutual distances between the magnetic sensors A1 to A3 and the magnetic sensors B1 to B3 arranged with the spacing in the circumferential direction of the target can be regulated by the size d1 and can be reliably retained at the desired distance. As a result, the sensors A1 and B1 for two channels can be precisely arranged without any dispersion in the parallelism between the magnetic sensor A1 and the magnetic sensor B1 and in the azimuth angle in the respective sensors. Moreover, the MR elements a1 to a3 and b1 to b3 for the six channels are mounted by using one substrate 14 and one magnet 12, so that the distances (i.e., the air gaps) between the respective magnetic sensors A1 to A3 and B1 to B3 and the corresponding targets 34 to 36 can be easily equalized to prevent the strain, as might otherwise be caused due to the difference in the air gaps, from appearing in the sensor output waveforms. Moreover, the respective positioning works of the magnetic sensors A1 to A3 and B1 to B3 with respect to the targets 34 to 36 can thus be easily done to detect the respective rotation angles of the input and output shafts 32 and 33 and the steering torque and steering angle to be applied to the steering member 1, in the desired detecting precision. Therefore, the steering assisting force can be properly decided according to the steering operation of the driver, and the adjusting work of the sensor output can also be easily done, thereby to simplify the assembling work of the detecting device and accordingly the steering device.

In this embodiment, moreover, the paired MR elements a1 to a3 and b1 to b3 for the respective targets 34 to 36 are arranged over the common cell Wc and at the circumferential positions different from each other with respect to the corresponding input and output shafts 32 and 33. Therefore, the paired MR elements a1 to a3 and b1 to b3 can output a plurality of identical waveforms different only in the phases in accordance with the respective rotations of the input and output shafts 32 and 33 so that they can output the signals of a predetermined phase difference in the electrical angle.

Further, in this embodiment, all the MR elements a1 to a3 and b1 to b3 are integrally fixed to the substrate through the adhesive layer 15. As compared with the case in which a plurality of MR elements are arranged to confront the targets respectively, therefore, the MR elements a1 to a3 and b1 to b3 can be easily arranged to confront the targets at the predetermined distance, and the distances between the respective MR elements a1 to a3 and b1 to b3 and the targets 34 to 36 can be prevented from any discrepancy.

There has been described the construction in which all the MR elements a1 to a3 and b1 to b3 of six channels are formed in the common cell Wc. However, the invention should not be limited to that construction but may be modified into a plurality of magnetic sensors each including a plurality of semiconductor MR elements, such that the irregularities of the electric characteristics, as might otherwise be caused due to the material difference of the semiconductor wafer, are eliminated by forming those semiconductor MR elements integrally over the common cell. Specifically, every MR elements (e.g., the MR elements a1 and b1) for two channels for each target may be integrally formed over the common cell. Alternatively, every two MR element units (e.g., the MR elements b2 and b3) arrayed in the axial direction may be integrally formed over the common cell.

Other than the construction thus far described, moreover, the magnet 12 can also be omitted by using a target having the magnetic poles N and S arranged alternately on the outer circumference, in place of the aforementioned targets 34 to 36 of the spur gear shape. By mounting the magnetic members not in the outer circumferences but in the disc side faces of the target gears 34 to 36, moreover, the rotation angles may be detected by a plurality of MR elements, which are arranged over those magnetic members and in parallel with the axial direction of the steering shaft 3.

In the foregoing description, the invention is applied to the electric power steering device having the auxiliary steering unit for applying the steering assisting force to the steering system with the reduction mechanism and the electric motor 6. However, the rotation angle detecting device and the torque detecting device of the invention should not be limited thereto but can also be applied to a variety of detecting devices for detecting the rotation angle of a rotary member or the torque to be applied to the rotary member. The invention can be further applied to an auxiliary steering device of another type such as a hydraulic power steering device for controlling hydraulic valves on the basis of the steering torque, or even a vehicle having no auxiliary steering device.

The invention thus far constructed has the following effects.

According to the rotation angle detecting device of the invention, the electric characteristics of the semiconductor MR elements can be made identical to prevent the output waveforms of the magnetic sensors from dispersed due to the material difference of the semiconductor wafer.

According to the rotation angle detecting device of the invention, the semiconductor MR elements can output a plurality of identical waveforms having only phase difference in accordance with the rotation of the rotary member so that the signals outputted can have the predetermined phase difference in the electrical angle.

According to the rotation angle detecting device of the invention, the respective semiconductor MR elements can be easily arranged to confront the targets at the predetermined distance while preventing the discrepancy in the distances between the respective semiconductor MR elements and the targets.

According to the rotation angle detecting device of the invention, the respective rotation angles of the first and second rotary shafts are precisely detected by using the outputs of the semiconductor MR elements having the homogeneous electric characteristics, so that the detecting precision of the torque can be prevented from degrading.

According to the rotation angle detecting device of the invention, the electric characteristics of all the semiconductor MR elements contained in the detecting device can be made identical to prevent the drop in the torque detecting precision more reliably.

What is claimed is:

1. A rotation angle detecting device comprising:
   a target comprising a magnetic member connected integrally rotatably with a rotary member; and
   a plurality of magnetic sensors arranged to face confront the magnetic member for outputting signals according to a rotation of the rotary member,
   wherein the magnetic sensors respectively comprise semiconductor MR elements, and at least some of the semiconductor MR elements are formed over and integrally with a common cell of a semiconductor wafer.

2. The rotation angle detecting device according to claim 1, wherein the semiconductor MR elements are arranged over the common cell and at circumferential positions different from each other with respect to the rotary member.

3. The rotation angle detecting device according to claim 1, wherein the semiconductor MR elements are fixed integrally to a substrate through an adhesive layer.

4. The rotation angle detecting device according to claim 1, wherein all of the semiconductor MR elements in the rotation angle detecting device are formed over and integrally with a common cell of a semiconductor wafer.

5. The rotation angle detecting device according to claim 1, wherein the magnetic member comprises corrugations.

6. The rotation angle detecting device according to claim 5, wherein said target comprises a plurality of said targets, each said target including a magnetic member comprising corrugations.

7. A torque detecting device comprising:
   a rotation member comprising:
      a first rotary shaft; and
      a second rotary shaft connected coaxially to the first rotary shaft;
   rotation angle detecting devices provided to the first and second rotary shafts, respectively, each of the rotation angle detecting devices comprising;
      a target comprising a magnetic member connected integrally rotatably with the corresponding first or second rotary shaft, and
      a plurality of magnetic sensors arranged to face confront the magnetic member for outputting signals according to a rotation of the corresponding first or second rotation shaft,
      wherein the magnetic sensors respectively comprise semiconductor MR elements, and at least some of the semiconductor MR elements are formed over and integrally with a common cell of a semiconductor wafer; and
   a torque detecting unit for detecting a torque to be applied to the rotary member based on signals outputted from the corresponding rotation angle detecting devices.

8. The torque detecting device according to claim 7, wherein all the magnetic sensors contained in the rotation angle detecting devices comprise semiconductor MR elements formed integrally over a common cell of a semiconductor wafer.

9. The torque detecting device according to claim 7, wherein the semiconductor MR elements of respective rotation angle detecting devices are arranged over a common cell and at axial positions different from each other with respect to the rotary member.

10. The torque detecting device according to claim 7, wherein the semiconductor MR elements of each rotation angle detecting device are arranged over a common cell and at circumferential positions different from each other with respect to the rotary member.

11. The torque detecting device according to claim 7, wherein the semiconductor MR elements are fixed integrally to a substrate through an adhesive layer.

12. A rotation angle detecting device comprising:
   a target including a magnetic member rotatable about an axis; and
   a plurality of magnetic sensors arranged adjacent to the magnetic member for outputting signals according to a rotation of the magnetic member,
   wherein the magnetic sensors respectively include semiconductor MR elements, and at least some of the semiconductor MR elements are formed over and integrally with a common cell of a semiconductor wafer.

13. The rotation angle detecting device according to claim 12, wherein the semiconductor MR elements are arranged over the common cell and at circumferential positions different from each other with respect to the rotatable magnetic member.

14. The rotation angle detecting device according to claim 12, wherein the semiconductor MR elements are fixed integrally to a substrate through an adhesive layer.

15. The rotation angle detecting device according to claim 12, wherein all of the semiconductor MR elements in the rotation angle detecting device are formed over and integrally with a common cell of a semiconductor wafer.

16. The rotation angle detecting device according to claim 12, wherein the target is mounted on a steering shaft of a vehicle.

17. The rotation angle detecting device according to claim 12, wherein the magnetic member comprises corrugations.

18. The rotation angle detecting device according to claim 17, comprising a plurality of said targets, each said target including a magnetic member comprising corrugations.

* * * * *